US012763693B2

(12) United States Patent
Xu

(10) Patent No.: US 12,763,693 B2
(45) Date of Patent: Oct. 13, 2026

(54) FLYBACK CONVERTER AND CONTROL METHOD THEREOF

(71) Applicant: Joulwatt Technology Co., Ltd., Hangzhou (CN)

(72) Inventor: Xiangyong Xu, Hangzhou (CN)

(73) Assignee: Joulwatt Technology Co., Ltd., Hangzhou (CN)

( * ) Notice: Subject to any disclaimer, the term of this patent is extended or adjusted under 35 U.S.C. 154(b) by 145 days.

(21) Appl. No.: 18/939,997

(22) Filed: Nov. 7, 2024

(65) Prior Publication Data

US 2025/0149992 A1 May 8, 2025

(30) Foreign Application Priority Data

Nov. 8, 2023 (CN) ........................ 202311481741.1

(51) Int. Cl.
*H02M 3/335* (2006.01)
*H02M 1/00* (2006.01)
*H02M 1/08* (2006.01)

(52) U.S. Cl.
CPC ..... *H02M 3/33569* (2013.01); *H02M 1/0058* (2021.05); *H02M 1/08* (2013.01)

(58) Field of Classification Search
CPC ......... H02M 3/33569; H02M 3/33571; H02M 3/01; H02M 1/0058; H02M 1/006
See application file for complete search history.

(56) References Cited

U.S. PATENT DOCUMENTS 6,005,782 A 12/1999 Jain
9,906,140 B2 * 2/2018 Zhang .................... H02M 1/36
(Continued)

FOREIGN PATENT DOCUMENTS

CN 112701882 A 4/2021
CN 115118174 A * 9/2022 ........ H02M 3/33507
(Continued)

OTHER PUBLICATIONS

Huan Li "star PFC architecture" published Dec. 2022 (Year: 2022).*
(Continued)

*Primary Examiner* — Sisay G Tiku
(74) *Attorney, Agent, or Firm* — IPro, PLLC

(57) ABSTRACT

Disclosed is a flyback converter and a control method thereof. The flyback converter includes a first switching transistor, a second switching transistor, a transformer, a first capacitor, a power supply device. A resonant loop circuit is formed by connecting the first capacitor to a primary side winding of the transformer and the second switching transistor. In a first operating mode, a controllable switching transistor of the power supply device is turned on before the second switching transistor is turned off, and after the second switching transistor is turned off, the charging capacitor is charged and stores energy. In a second operating mode, before the first switching is turned on, the controllable switching transistor is turned on, and the charging capacitor is charged and stores energy. The conversion efficiency of the power supply is enhanced while enabling the first switching transistor to operate under zero voltage switching, thereby reducing switching losses.

18 Claims, 7 Drawing Sheets

(56) References Cited

U.S. PATENT DOCUMENTS

| | | | | |
|---|---|---|---|---|
| 11,757,367 | B2 * | 9/2023 | Wong ................ | H02M 3/33592 363/21.14 |
| 2022/0038020 | A1 | 2/2022 | Guo et al. | |
| 2025/0219546 | A1 * | 7/2025 | Lin ..................... | H02M 3/3353 |
| 2026/0039206 | A1 * | 2/2026 | Xu ...................... | H02M 1/0006 |

FOREIGN PATENT DOCUMENTS

| | | | | | |
|---|---|---|---|---|---|
| CN | 116232040 | A | * | 6/2023 | .............. H02M 1/36 |
| CN | 118137858 | A | * | 6/2024 | ........... H02H 7/1213 |
| CN | 119696349 | A | * | 3/2025 | |
| CN | 119696350 | A | * | 3/2025 | |

OTHER PUBLICATIONS

Li, Huan; Li, Sinan; Xiao, Weidong, "Star Power Factor Correction Architecture," IEEE Transactions on Power Electronics, vol. 38, Issue 3, pp. 3531-3545 (2023). DOI: 10.1109/tpel.2022.3225823.

Mahdavikhah, Behzad; Prodic, Aleksandar, "A digitally controlled DCM flyback converter with a low-volume dual-mode soft switching circuit," 2014 IEEE Applied Power Electronics Conference and Exposition—APEC 2014, pp. 63-68 (2014). DOI: 10.1109/apec.2014.6803290.

* cited by examiner

FLYBACK CONVERTER AND CONTROL METHOD THEREOF

CROSS-REFERENCE TO RELATED APPLICATION

This application claims priority to Chinese patent application of invention No. 202311481741.1 filed on Nov. 8, 2023, entitled "FLYBACK CONVERTER AND CONTROL METHOD THEREOF", the contents of which are incorporated herein by reference, including the full text of the specification, claims, drawings and abstract.

TECHNICAL FIELD

The present disclosure relates to a field of lighting technology, and more particularly, to a flyback converter and a control method thereof.

BACKGROUND

Asymmetric half-bridge-) flyback converters and active clamp flyback (ACF) converters are more efficient than conventional PWM or quasi-resonant flyback converters, and AHB flyback converters are more suitable for applications requiring a wide range of output than LLC converters. For applications requiring a wide range of output, a rectified voltage on the auxiliary winding is also of a wide range. As shown in FIG. 1, conventional power supply solutions need to have an auxiliary winding for providing power supply, and an additional stage of a low dropout regulator (LDO) or a switching converter (DC-DC) for voltage regulation.

Therefore, the power supply of the auxiliary winding in the prior art requires not only an auxiliary winding, but also an LDO or DC-DC converter for voltage regulation. The system structure is complex and the conversion efficiency is poor.

SUMMARY OF THE DISCLOSURE

The object of the present disclosure is to provide a flyback converter and a power supply method thereof, which enhances the conversion efficiency of the converter, while enabling a main switching transistor to be turned on by zero voltage switching.

The present disclosure also provides a flyback converter including a first switching transistor, a second switching transistor, a transformer, and a first capacitor, wherein a resonant loop circuit is formed by connecting the first capacitor to a primary side winding of the transformer and the second switching transistor, and the flyback converter further includes:

- a power supply device connected to a common node of the first switching transistor and the second switching transistor to provide a supply voltage;
- wherein the power supply device includes a controllable switching transistor and a charging capacitor, in a first operating mode, the controllable switching transistor is turned on before the second switching transistor is turned off, and after the second switching transistor is turned off, the charging capacitor is charged and stores energy; in a second operating mode, before the first switching is turned on, the controllable switching transistor is turned on, and the charging capacitor is charged and stores energy; the supply voltage is obtained according to a voltage across the charging capacitor.

Optionally, when the supply voltage reaches a threshold voltage, the controllable switching transistor is turned off and stops charging the charging capacitor.

Optionally, an on time of the controllable switching transistor is adjusted adaptively according to whether the first switching transistor is turned on by zero voltage switching;

- in a case that the first switching transistor is turned on by zero voltage switching, the on time of the controllable switching transistor is decreased; In a case that the first switching transistor is turned on by non-zero voltage switching, the on time of the controllable switching transistor is increased.

Optionally, the first operating mode is a boundary conduction mode, a pre-off time of the second switching transistor is obtained, and a turn-on moment of the controllable switching transistor is controlled according to the pre-off time.

Optionally, the second operating mode is a discontinuous-conduction mode, a pre-on time of the first switching transistor is obtained, and a turn-on moment of the controllable switching transistor is controlled according to the pre-on time.

Optionally, the flyback converter further includes a switching control circuit which generates a switching control signal of the first switching transistor and a switching control signal of the second switching transistor, and obtains the pre-on time according to the switching control signal of the first switching transistor.

Optionally, in a first operating mode, the switching control circuit controls an on state of the controllable switching transistor according to the switching control signal of the second switching transistor; in a second operating mode, the switching control circuit controls an on state of the controllable switching transistor according to the switching control signal of the first switching transistor.

Optionally, a pre-off time of the second switching transistor is obtained, and the second switching transistor is turned off after a delay of a first time from the pre-off time;

- in a non-initial switching cycle, it is determined whether the first switching transistor is turned on by zero voltage switching during the current switching cycle, and if the first switching transistor is turned on by zero voltage switching, the first time remains unchanged or is decreased; if the first switching transistor is turned on by non-zero voltage switching, the first time is increased.

Optionally, a voltage detection signal that represents a voltage across two ends of the primary side winding is obtained, if the voltage detection signal in the previous switching cycle is less than a product of the voltage detection signal and k1 in the current switching cycle, it is determined that the first switching transistor is turned on by zero voltage switching in the current switching cycle; wherein k1 is greater than 0 and less than or equal to 1.

Optionally, a change rate of the voltage across the second switching transistor is detected within a preset time period which is a time period starting before the first switching transistor is turned on and lasting after the first switching transistor is turned on; if the change rate is less than a first threshold, it is determined that the first switching transistor is turned on by zero voltage switching.

Optionally, a change value of the voltage across the second switching transistor is detected within a preset time period which is a time period starting before the first switching transistor is turned on and lasting after the first switching transistor is turned on; if the change value is less than a second threshold, it is determined that the first switching transistor is turned on by zero voltage switching in the current switching cycle.

Optionally, the pre-off time of the second switching transistor is obtained by detecting the moment when an excitation inductor current generated by the primary side winding of the transformer drops to a zero current.

Optionally, the power supply device further includes a first diode, the first diode and the controllable switching transistor being connected in series with each other;

a high-potential end of the charging capacitor is connected to the controllable switching transistor, a low-potential end of the charging capacitor is grounded, and the voltage across the charging capacitor is the supply voltage.

Optionally, the power supply device further includes a discharge circuit connected in parallel with the charging capacitor; before the controllable switching transistor is turned off, if the supply voltage is greater than a reference voltage, the discharge circuit is activated to discharge the charging capacitor.

Optionally, the flyback converter further includes an auxiliary winding which is coupled to one winding of the transformer; before the controllable switching transistor is turned off, if the supply voltage is lower than a reference voltage, the auxiliary winding provides an auxiliary voltage to charge the charging capacitor.

The present disclosure also provides a power supply method for a flyback converter, which includes a first switching transistor, a second switching transistor, a transformer, and a first capacitor, wherein a resonant loop circuit is formed by connecting the first capacitor to a primary side winding of the transformer and the second switching transistor. The power supply method includes: providing a supply voltage by a power supply device, which is connected to a common node of the first switching transistor and the second switching transistor to provide the supply voltage;

wherein the power supply device includes a controllable switching transistor and a charging capacitor, in a first operating mode, the controllable switching transistor is turned on before the second switching transistor is turned off, and after the second switching transistor is turned off, the charging capacitor is charged and stores energy; in a second operating mode, before the first switching is turned on, the controllable switching transistor is turned on, and the charging capacitor is charged and stores energy; the supply voltage is obtained according to a voltage across the charging capacitor.

Optionally, when the supply voltage reaches a threshold voltage, the controllable switching transistor is turned off and stops charging the charging capacitor.

Optionally, an on time of the controllable switching transistor is adjusted according to whether the first switching transistor is turned on by zero voltage switching; in a case that the first switching transistor is turned on by zero voltage switching, the on time of the controllable switching transistor is decreased; in a case that the first switching transistor is turned on by non-zero voltage switching, the on time of the controllable switching transistor is increased.

Optionally, the first operating mode is a boundary conduction mode, a pre-off time of the second switching transistor is obtained, and a turn-on moment of the controllable switching transistor is controlled according to the pre-off time.

Optionally, the second operating mode is a discontinuous-conduction mode, a pre-on time of the first switching transistor is obtained, and a turn-on moment of the controllable switching transistor is controlled according to the pre-on time.

Compared with the prior art, the present disclosure has the following advantages: a power supply device is provided at a common node of the first switching transistor and the second switching transistor to generate a supply voltage, thereby optimizing the power supply efficiency of the flyback converter, and requiring simple system peripheral parameters; moreover, the power supply device facilitates zero voltage switching (ZVS) of the main switch (i.e., the first switching transistor), thereby reducing switching losses.

DETAILED DESCRIPTION OF EMBODIMENTS

The following preferred embodiments of the present disclosure are described in detail in conjunction with attached drawings, but the disclosure is not limited to these embodiments. The present disclosure includes any alternatives, modifications, equivalent methods, and solutions made within the spirit and scope of the present disclosure.

In order to enable the public to have a thorough understanding of the present disclosure, specific details are described in detail in the following preferred embodiment of the present disclosure, even in a case that the present disclosure can be fully understood by those skilled in the art without the description of these details.

The present disclosure is described more specifically by way of example hereinafter with reference to the accompanying drawings. It should be noted that the drawings are presented in a simplified manner and use approximate proportions to conveniently and clearly illustrate the purpose of the embodiments of the present disclosure.

The flyback converter in the present disclosure is generally an asymmetric-half-bridge (AHB) flyback converter, including a first switching transistor as a main switch of the flyback converter and a second switching transistor as a freewheeling transistor, and further including a first capacitor, a transformer and a rectification transistor, the first switching transistor and the second switching transistor being connected with each other, the second switching transistor, the first capacitor and a primary side of the transformer being connected into a resonant loop circuit, and the rectification transistor being connected to a secondary side of the transformer. The power converter according to the present disclosure is not limited to an asymmetric-half-bridge (AHB) flyback converter, and the flyback converters with the connection relationship described above, such as an active clamp flyback converter (ACF), are all within the scope of the present disclosure.

Figure 1:
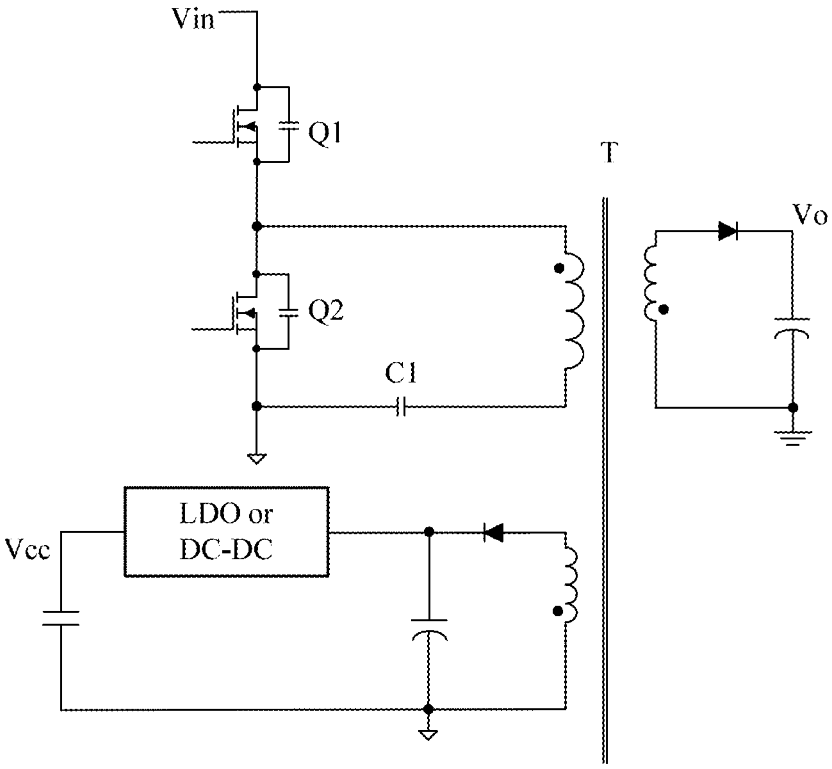
FIG. 1 is a schematic diagram illustrating a conventional flyback converter powered by an auxiliary winding.
Figure 2:
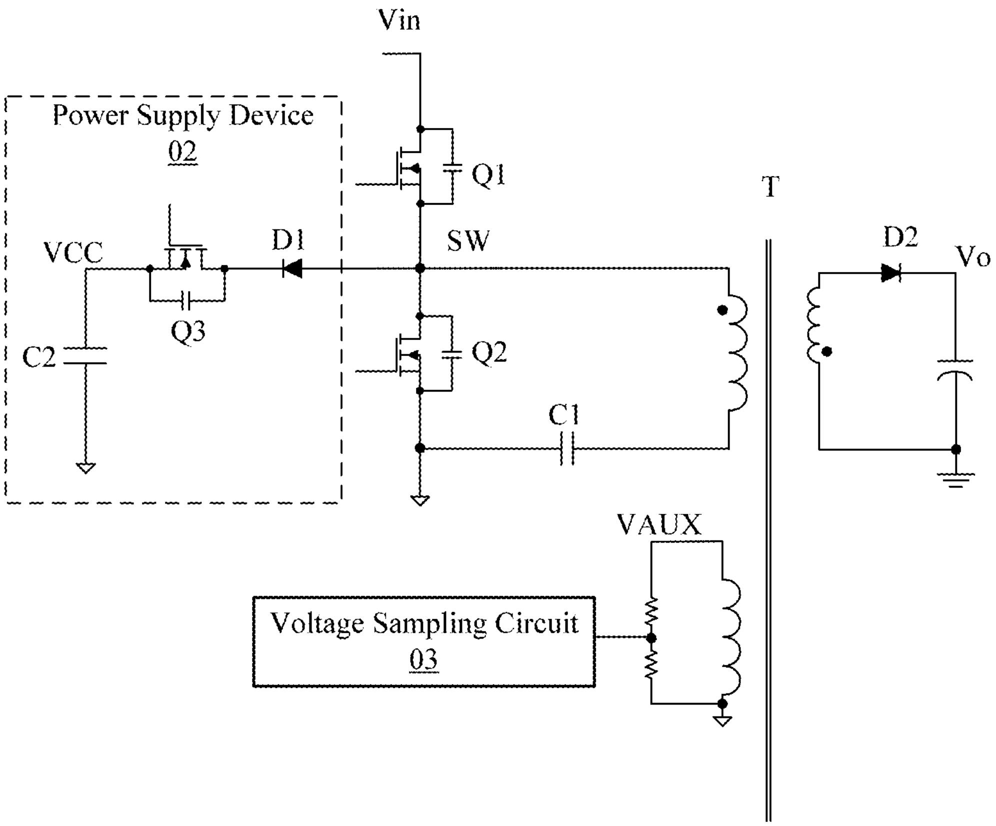
FIG. 2 is a schematic diagram illustrating a first example of power supply for the flyback converter according to the present disclosure.

As shown in FIG. 2, a schematic diagram illustrates a first example of power supply for the flyback converter. The flyback converter in the figure is an active clamp flyback converter (ACF), including a first switching transistor Q1, a second switching transistor Q2, a first capacitor C1, a transformer T, and a synchronous rectification transistor. A first end of the first switching transistor Q1 receives an input voltage Vin, a second end of the first switching transistor Q1 is connected to the second switching transistor Q2, and a second end of the second switching transistor Q2 is grounded. A primary side winding of the transformer T is connected to the first capacitor C1 and the second switching transistor Q2 to form a resonant loop circuit.

The flyback converter also includes a power supply device connected in parallel with the second switching transistor Q2 to provide a supply voltage. The power supply device includes a controllable switching transistor and a charging capacitor. Its working principle is described as follows: before the first switching transistor Q1 is turned on, the power supply device completes energy storage to provide the supply voltage and enables the first switching transistor Q1 to be turned on by zero voltage switching; in a first operating mode, before the second switching transistor Q2 is turned off, the controllable switching transistor is turned on, and after the second switching transistor Q2 is turned off, the charging capacitor is charged and stores energy; in a second operating mode, before the first switching Q1 is turned on, the controllable switching transistor is turned on, and the charging capacitor is charged and stores energy; when the supply voltage reaches a threshold voltage, the controllable switching transistor is turned off and stops charging the charging capacitor. Here, the first operating mode is a boundary conduction mode, a pre-off time of the second switching transistor is obtained, and a turn-on moment of the controllable switching transistor is controlled according to the pre-off time; the second operating mode is discontinuous-conduction mode a discontinuous-conduction mode, a pre-on time of the first switching transistor is obtained, and a turn-on moment of the controllable switching transistor is controlled according to the pre-on time.

As shown in FIG. 2, the power supply device includes a first diode D1, a controllable switching transistor Q3 and a charging capacitor C2. An anode of the first diode D1 is connected to a common node of the first switching transistor Q1 and the second switching transistor Q2, a cathode of the first diode D1 is connected to a first end of the controllable switching transistor Q3, a second end of the controllable switching transistor Q3 is connected to a high-potential end of the charging capacitor C2, and a low-potential end of the charging capacitor C2 is aground terminal; in a case that the controllable switching transistor Q3 has a reverse-parallel-coupled body diode, the body diode is connected in the opposite direction to the first diode D1, preventing unnecessary charging of the charging capacitor C2 when the controllable switching transistor Q3 is turned off. Before the first switching transistor Q1 is turned on, the controllable switching transistor Q3 is turned on. When the second switching transistor Q2 is turned off, the first capacitor C1 discharges, and the charging capacitor is charged. The first capacitor C1, the first diode D1, the controllable switch tube Q3 and the charging capacitor C2 form a discharge loop. There are two control modes for an on time of the controllable switching transistor Q3. One control mode is that when a supply voltage Vcc generated across the charging capacitor C2 reaches a threshold voltage Vcc_H, the controllable switching transistor Q3 is turned off; the other control method is to adaptively adjust the on time of the controllable switching transistor Q3 according to whether the first switching transistor Q1 is turned on by zero voltage switching. That is, in a case that the first switching transistor Q1 is turned on by zero voltage switching, the on time of the controllable switching transistor Q3 is decreased, and in a case that the first switching transistor Q1 is turned on by non-zero voltage switching, the on time of the controllable switching transistor Q3 is increased.

Figure 3:
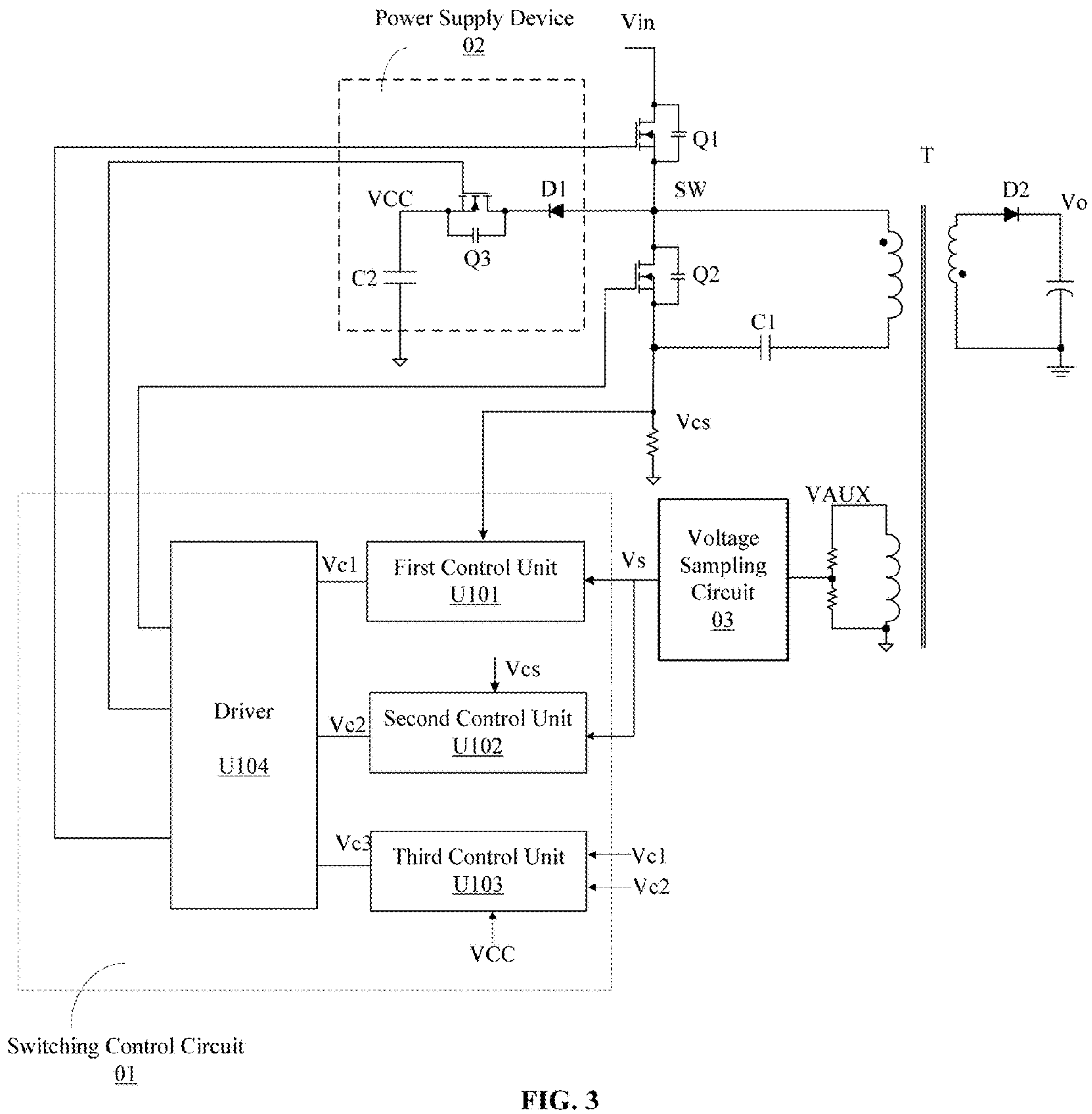
FIG. 3 is a control block diagram of the flyback converter according to the present disclosure.

As shown in FIG. 3, a control block diagram of the flyback converter according to the present disclosure is illustrated. The switching control circuit 01 of the flyback converter is used to control on and off states of the first switching transistor Q1, the second switching transistor Q2, and the controllable switching transistor Q3. The switch control circuit 01 includes a first control unit U101, a second control unit U102, a third control unit U103, and a driver U104. When a diode D2 at a secondary side of the flyback converter is turned on, a voltage sampling circuit 03 samples a voltage across the auxiliary winding to obtain a sampling voltage Vs that represents an output voltage, and obtains a current sampling signal Vcs that represents an excitation current of the transformer T. The first control unit U101 and the second control unit U102 generate a first switching control signal Vc1 and a second switching control signal Vc2 according to the sampling voltage Vs and the current sampling signal Vcs, respectively. The first switching control signal Vc1 and the second switching control signal Vc2 respectively control on and off states of the first switching transistor Q1 and the second switching transistor Q2 through the driver U104. Meanwhile, the third control unit U103 receives the first switching control signal Vc1, the second switching control signal Vc2, and the supply voltage VCC to generate a third switching control signal Vc3 to control on and off states of the controllable switching transistor Q3. In a boundary conduction mode, a pre-off time of the second switching transistor Q2 is obtained according to the second switching control signal Vc2, and a turn-on moment of the conduction of the controllable switching transistor according to the pre-off time; in a discontinuous-conduction mode, a pre-on time of the first switching transistor Q1 is obtained according to the first control signal Vc1, and a turn-on moment of the controllable switching transistor Q3 is controlled according to the pre-on time. In the on state of the controllable switching transistor Q3, the discharge of the first capacitor C1 generates a negative excitation current at the primary side of the transformer T, enabling zero-voltage switching (ZVS) of the first switch tube Q1, thereby reducing the switching losses. The principle of power supply according to the present disclosure will be described in connection with working waveforms of the flyback converter in BCM and DCM modes, respectively.

Figure 4:
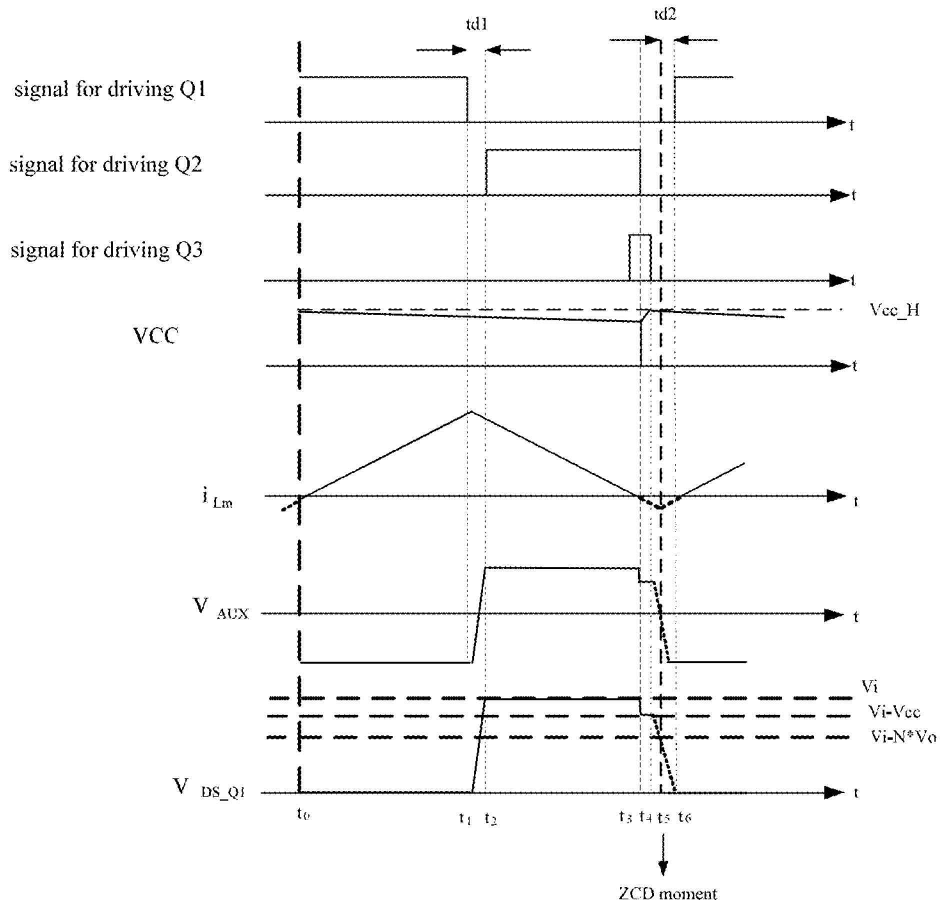
FIG. 4 shows signal waveforms of the flyback converter according to the present disclosure when operating in boundary conduction mode (BCM).

As shown in FIG. 4, signal waveforms of the flyback converter according to the present disclosure when operating in the boundary conduction mode (BCM) are illustrated. A pre-off time of the second switching transistor Q2 is obtained. Before the second switching transistor Q2 is turned off, the controllable switching transistor Q3 is turned on in advance. A self-powered line does not charge the power supply device because the second switching transistor Q2 is turned on at this time. At t3 in FIG. 4, the second switching transistor Q2 is turned off. At this time, the first capacitor C1 charges the charging capacitor C2 through the circuit formed by the excitation inductor, the first diode D1, and the controllable switching transistor Q3. At this time, the voltage Vds_Q2 across the second switching transistor Q2 is equal to the supply voltage Vcc (a conduction voltage drop of D2 is omitted). A voltage Vds_Q1 across the first switching transistor Q1 is equal to (Vin−Vcc). At t4, in a case that the supply voltage Vcc generated by the charging capacitor C2 reaches an off threshold Vcc_H, the controllable switching transistor Q3 is turned off. After the controllable switching transistor Q3 is turned off, a negative excitation current starts charging a parasitic capacitance of the second switching transistor Q2, discharging a parasitic capacitance of the first switching transistor Q1, and preparing for turning on the first switching transistor Q1 by ZVS. At t5, the voltage across the primary side winding of the transformer T is zero (that is, at ZCD). After a dead time td2, the first switching transistor Q1 is turned on by zero voltage switching (i.e. ZVS). In the waveforms shown in FIG. 4, the second switching transistor Q2 is turned off at the moment when the excitation current reaches zero. In practical applications, the turn-off timing of the second switching transistor Q2 is adaptively controlled according to the ZVS of the first switching transistor Q1. If the first switching transistor Q1 in the previous switching cycle is not turned on by ZVS, the second switching transistor Q2 in the next switching cycle is delayed and then turned off. This generates more initial negative excitation current in advance, so that the first switching transistor Q1 is turned on by ZVS. The control method for adaptively controlling the turn-off timing of the second switching transistor Q2 is as follows: a pre-off time of the second switching transistor Q2 is obtained, and the second switching transistor Q2 is turn off after a delay of a first time from the pre-off time of the second switching transistor Q2. Normally, the pre-off time is the moment when the excitation current reaches zero, or may be the moment shortly after the excitation current reaches zero. The first time is set as follows: During non-initial switching cycles, it is determined whether the first switching transistor Q1 is turned on by zero voltage switching in the current switching cycle; in a case that the first switching transistor Q1 is turned on by zero voltage switching, the first time is controlled to either remain unchanged or be decreased; in a case that the first switching transistor Q1 is turned on by non-zero voltage switching, the first time is controlled to be increased. Determining whether the first switching transistor Q1 is turned on by zero voltage switching is as follows: optionally, a voltage detection signal that represents a voltage across two ends of the primary side winding; if the voltage detection signal in the previous switching cycle is less than a product of the voltage detection signal in the current switching cycle and k1, it is determined that the first switching transistor Q1 is turned on by zero voltage switching, wherein k1 is greater than 0 and less than or equal to 1; an auxiliary winding is additionally provided and coupled to either the primary side winding or the secondary side winding of the transformer T, and the voltage detection signal is obtained by detecting an electrical signal across the auxiliary winding. Optionally, a change rate Δ Vds_Q2/Δt of the voltage across the second switching transistor Q2 is detected within a preset time period, which is set to be a time period starting before the first switching transistor is turned on and lasting after the first switching transistor is turned on; if it is determined that the change rate is less than a first threshold, it is determined that the first switching transistor Q1 is turned on by zero voltage switching. Optionally, a change value A Vds_Q2 of the voltage across the second switching transistor Q2 within a preset time period is detected, which is set to a time period starting before the first switching transistor is turned on and lasting after the first switching transistor is turned on; if the change value is less than a second threshold value, it is determined that the first switching transistor is turned on by zero voltage switching in the current switching cycle. There are other methods to determine whether the first switching transistor Q1 is turned on by zero voltage switching, which will not be listed here.

Figure 5:
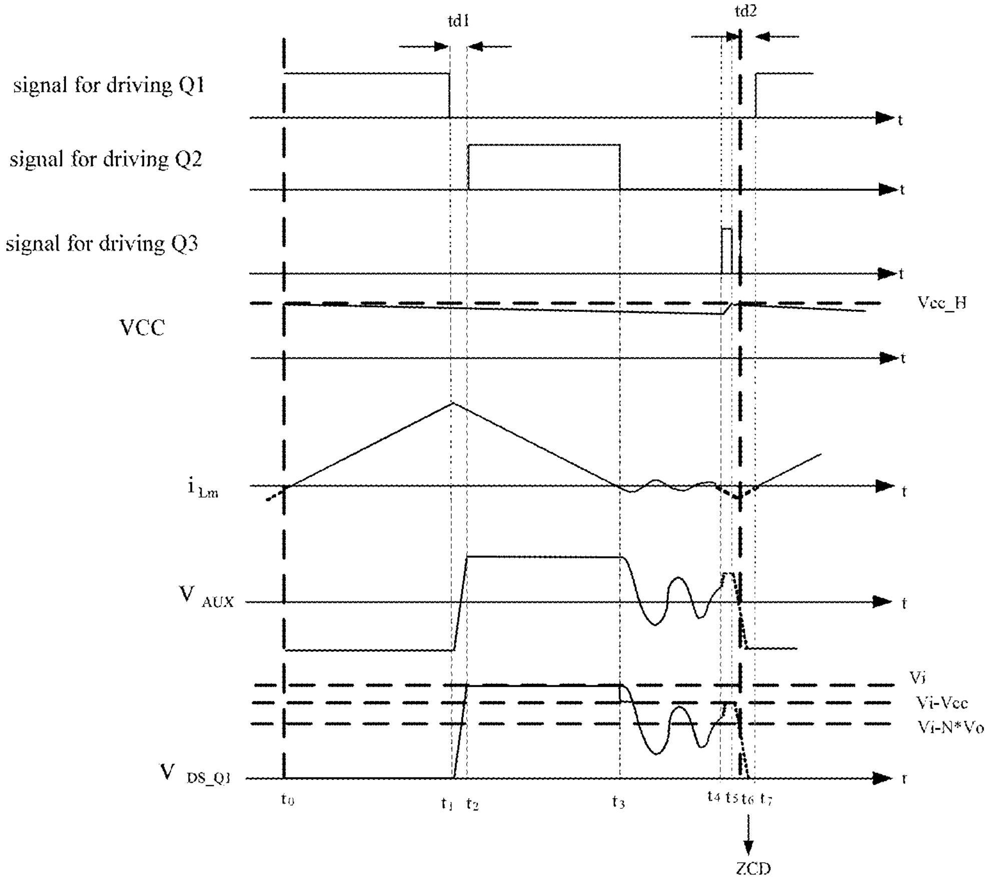
FIG. 5 shows signal waveforms of the flyback converter according to the present disclosure when operating in discontinuous-conduction mode (DCM)

As shown in FIG. 5, signal waveforms of the flyback converter according to the present disclosure when operating in the discontinuous-conduction mode (DCM) are illustrated. The second switching transistor Q2 is turned off when the excitation current reaches zero (at t3). After the second switching transistor Q2 is turned off for a certain time period (during t3-t4), before the first switching transistor Q1 is turned on in the next switching cycle, the controllable switching transistor Q3 is turned on in advance. The first capacitor C1 charges the charging capacitor C2, and the supply voltage Vcc generated across the charging capacitor C2 increases. Meanwhile, the transformer T generates a negative excitation current at the primary side, so that the first switching transistor Q1 is turned on by ZVS. The controllable switching transistor Q3 is turned off when the supply voltage Vcc increases and reaches a threshold voltage Vcc_H.

When operating in the BCM and DCM modes, the flyback converter according to the present disclosure can realize ZVS because the power supply device assists the first switching transistor Q1, thereby reducing the switching losses. In the waveforms shown in FIGS. 4 and 5, it is illustrated that the controllable switching transistor Q3 is controlled to be turned off when the supply voltage VCC reaches the threshold voltage Vcc_H. If the turn-off timing of the controllable switching transistor Q3 is set according to the threshold voltage Vcc_H, there may be the following conditions: ① the supply voltage VCC is charged to the preset threshold voltage Vcc_H, but the first switching transistor Q1 is not turned on exactly by zero voltage switching (i.e. ZVS); especially, in the CCM mode, the first switching transistor Q1 cannot be turned on exactly by zero voltage switching, by adjusting the turn-off timing of the second switching transistor Q2; ② the supply voltage VCC is charged to the preset threshold voltage Vcc_H, and the first switching transistor Q1 is turned on by zero voltage switching; however, the ZVS is over-regulated, resulting in additional energy loss due to repeated regulation loss. Here, the turning-on timing of the controllable switching transistor Q3 is adaptively adjusted according to whether the first switching transistor Q1 is turned on by zero voltage switching. This approach addresses issues that arise when the turning-on timing of the controllable switching transistor Q3 is determined according to the threshold voltage Vcc_H, which may lead to either over-regulation of the ZVS or turning on not exactly by zero voltage switching of the first switching transistor Q1.

There are various ways to determine whether the first switching transistor Q1 is turned on by zero voltage switching: a voltage detection signal that represents a voltage across two ends of the primary side winding is obtained, by directly obtaining the voltage detection signal at the primary side winding, or by obtaining the voltage detection signal at an auxiliary winding; if the voltage detection signal in the previous switching cycle is less than the voltage detection signal in the current switching cycle, it is determined that the first switching transistor Q1 is turned on by zero voltage switching; detecting a change rate/change value of the voltage across the second switching transistor within a preset time period, which is a time period starting before the first switching transistor is turned on and lasting after the first switching transistor is turned; if it is determined that the change rate/change value is less than a corresponding threshold, it is determined that the first switching transistor is turned on by zero voltage switching; the ways of determining whether the first switching transistor Q1 is turned on by zero voltage switching are not limited to those described above.

Although it can ensure that the first switching transistor Q1 is turned on by zero voltage switching when the turn-off timing of the controllable switching transistor Q3 is controlled according to whether the first switching transistor Q1 is turned on by zero voltage switching, there are the following conditions: ① the first switching transistor Q1 is turned on by zero voltage switching, but the charging capacitor C2 is overcharged, and the supply voltage VCC is too large; ② the first switching transistor Q1 is turned on by zero voltage switching, but the charging capacitor C2 is undercharged, and the supply voltage VCC is too small. In view of the above two issues, the power supply device has been further improved in the present disclosure, with reference to FIGS. 6 and 7 below.

Figure 6:
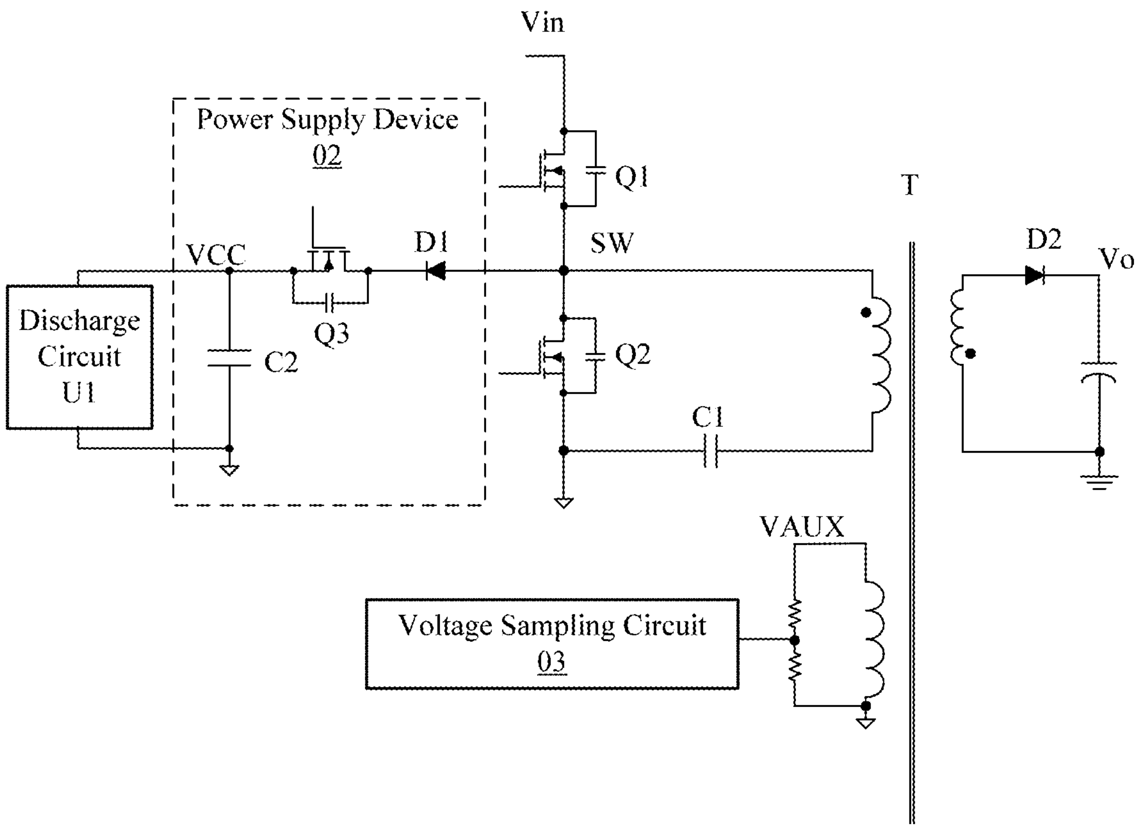
FIG. 6 is a schematic diagram illustrating a second example of power supply for the flyback converter according to the present disclosure.

As shown in FIG. 6, a second example of power supply for the flyback converter according to the present disclosure is illustrated. In addition to FIG. 2, there is an additional discharge circuit U1 which is connected in parallel with the charging capacitor C2. Before the first switching transistor Q1 is turned on by zero voltage switching, if it is detected that the supply voltage VCC is greater than a preset reference voltage, the discharge circuit U1 discharges the charging capacitor C2 so that the supply voltage VCC is not too large. There are various implementations of the discharge circuit U1, one of which is a series circuit consisting of a resistor and a switch. The series circuit and the charging capacitor are connected in parallel; when the power supply VCC is greater than the preset reference voltage, the switch is closed; the other of which includes a MOS transistor connected in parallel with the charging capacitor C2; when the power supply VCC is greater than the preset reference voltage, the MOS transistor is controlled to be turned on; There are various implementations of the discharge circuit, but will not be described in detail here.

Figure 7:
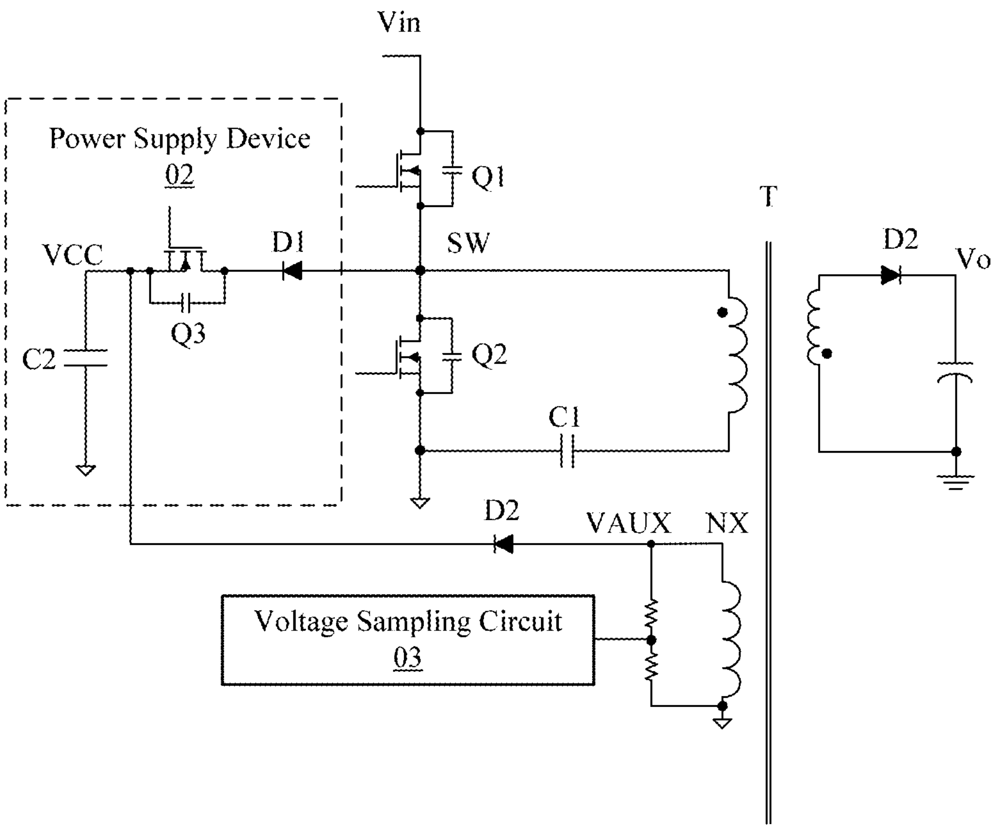
FIG. 7 is a schematic diagram illustrating a third example of power supply for the flyback converter according to the present disclosure.

As shown in FIG. 7, a third example of power supply for the flyback converter of the present disclosure is illustrated. In addition to FIG. 2, there is an auxiliary winding for supplying power. Specifically, the auxiliary winding NX is connected with a high-potential end of the charging capacitor C2 through the diode D2. When the first switching transistor Q1 is turned on by zero voltage switching, or before the first switching transistor Q1 is turned on, if the supply voltage VCC is detected to be less than the preset threshold voltage, it indicates that the supply voltage VCC generated across the charging capacitor C2 is insufficient. The auxiliary winding NX is needed for auxiliary power supply, so that the supply voltage VCC exactly meets the power supply requirement.

Although the above embodiments are described and explained separately, some technical aspects are commonly shared. It can be understood by those skilled in the art that some technical aspects of the embodiments can be replaced or combined together. Even in a case that some aspects are not explicitly depicted in one embodiment, reference may be made to other embodiments.

The above-mentioned embodiments do not limit the scope of protection of the technical solution. Any modifications, equivalent substitutions, and improvements made within the spirit and principles of the embodiments mentioned above shall be included within the scope of protection of the present disclosure.

The invention claimed is:

1. A flyback converter, comprising a first switching transistor, a second switching transistor, a transformer, and a first capacitor, wherein a resonant loop circuit is formed by connecting the first capacitor to a primary side winding of the transformer and the second switching transistor, and the flyback converter further comprises: a power supply device connected to a common node of the first switching transistor and the second switching transistor to provide a supply voltage; wherein the power supply device comprises a controllable switching transistor and a charging capacitor, in a first operating mode, the controllable switching transistor is turned on before the second switching transistor is turned off, and after the second switching transistor is turned off, the charging capacitor is charged and stores energy; in a second operating mode, before the first switching transistor is turned on, the controllable switching transistor is turned on, and the charging capacitor is charged and stores energy; the supply voltage is obtained according to a voltage across the charging capacitor,wherein: an on time of the controllable switching transistor is adjusted adaptively according to whether the first switching transistor is turned on by zero voltage switching; in a case that the first switching transistor is turned on by zero voltage switching, the on time of the controllable switching transistor is decreased; in a case that the first switching transistor is turned on by non-zero voltage switching, the on time of the controllable switching transistor is increased, wherein the first operating mode is a boundary conduction mode, and the second operating mode is a discontinues conduction mode.

2. The flyback converter according to claim 1, wherein: when the supply voltage reaches a threshold voltage, the controllable switching transistor is turned off and stops charging the charging capacitor.

3. The flyback converter according to claim 1, wherein: a voltage detection signal that represents a voltage across two ends of the primary side winding is obtained, if the voltage detection signal in a previous switching cycle is less than a product of the voltage detection signal and k1 in a current switching cycle, it is determined that the first switching transistor is turned on by zero voltage switching in the current switching cycle; wherein k1 is greater than 0 and less than or equal to 1.

4. The flyback converter according to claim 1, wherein: a change rate of a voltage across the second switching transistor is detected within a preset time period which is a time period starting before the first switching transistor is turned on and lasting after the first switching transistor is turned on; if the change rate is less than a first threshold, it is determined that the first switching transistor is turned on by zero voltage switching in a current switching cycle.

5. The flyback converter according to claim 1, wherein: a change value of a voltage across the second switching transistor is detected within a preset time period which is set to be a time period starting before the first switching transistor is turned on and lasting after the first switching transistor is turned on; if the change value is less than a second threshold value, it is determined that the first switching transistor is turned on by zero voltage switching in a current switching cycle.

6. The flyback converter according to claim 1, wherein: the power supply device further comprises a first diode, which is connected in series with the controllable switching transistor; a high-potential end of the charging capacitor is connected to the controllable switching transistor, a low-potential end of the charging capacitor is grounded, and the voltage across the charging capacitor is the supply voltage.

7. The flyback converter according to claim 6, wherein: the power supply device further comprises a discharge circuit connected in parallel with the charging capacitor;

before the controllable switching transistor is turned off, if the supply voltage is higher than a reference voltage, the discharge circuit is activated to discharge the charging capacitor.

8. The flyback converter according to claim 6, further comprising: an auxiliary winding which is coupled to one winding of the transformer;

before the controllable switching transistor is turned off, if the supply voltage is lower than a reference voltage, the auxiliary winding provides an auxiliary voltage to charge the charging capacitor.

9. The flyback converter according to claim 1, wherein: the first operating mode is a boundary conduction mode, a pre-off time of the second switching transistor is obtained, and a turn-on moment of the controllable switching transistor is controlled according to the pre-off time.

10. The flyback converter according to claim 9, wherein: a pre-off time of the second switching transistor is obtained, and the second switching transistor is turned off after a delay of a first time from the pre-off time of the second switching transistor;

in a non-initial switching cycle, it is determined whether the first switching transistor is turned on by zero voltage switching during a current switching cycle, and if the first switching transistor is turned on by zero voltage switching, the first time remains unchanged or is decreased; if the first switching transistor is turned on by non-zero voltage switching, the first time is increased.

11. The flyback converter according to claim 10, wherein: the pre-off time of the second switching transistor is obtained by detecting a moment when an excitation inductor current generated by the primary side winding of the transformer drops to a zero current.

12. The flyback converter according to claim 1, wherein: the second operating mode is a discontinuous-conduction mode, a pre-on time of the first switching transistor is obtained, and a turn-on moment of the controllable switching transistor is controlled according to the pre-on time.

13. The flyback converter according to claim 12, further comprising: a switching control circuit which is configured to generate a switching control signal of the first switching transistor and a switching control signal of the second switching transistor, and obtain the pre-on time according to the switching control signal of the first switching transistor.

14. The flyback converter according to claim 13, wherein: in the first operating mode, the switching control circuit is configured to control an on state of the controllable switching transistor according to the switching control signal of the second switching transistor; in the second operating mode, the switching control circuit is configured to control an on state of the controllable switching transistor according to the switching control signal of the first switching transistor.

15. A power supply method for a flyback converter, comprising a first switching transistor, a second switching transistor, a transformer and a first capacitor, wherein a resonant loop circuit is formed by connecting the first capacitor a primary side winding of the transformer and the second switching transistor, wherein the power supply method comprises: providing a supply voltage by a power supply device, which is connected to a common node of the first switching transistor and the second switching transistor to provide the supply voltage; wherein the power supply device comprises a controllable switching transistor and a charging capacitor, in a first operating mode, the controllable switching transistor is turned on before the second switching transistor is turned off, and after the second switching transistor is turned off, the charging capacitor is charged and stores energy; in a second operating mode, before the first switching transistor is turned on, the controllable switching transistor is turned on, and the charging capacitor is charged and stores energy; the supply voltage is obtained according to a voltage across the charging capacitor, wherein the power supply method further comprises: adjusting an on time of the controllable switching transistor according to whether the first switching transistor is turned on by zero voltage switching; wherein in a case that the first switching transistor is turned on by zero voltage switching, the on time of the controllable switching transistor is decreased; in a case that the first switching transistor is turned on by non-zero voltage switching, the on time of the controllable switching transistor is increased, wherein the first operating mode is a boundary conduction mode, and the second operating mode is a discontinues conduction mode.

16. The power supply method according to claim 15, wherein: when the supply voltage reaches a threshold voltage, the controllable switching transistor is turned off and stops charging the charging capacitor.

17. The power supply method according to claim 15, wherein: the first operating mode is a boundary conduction mode, a pre-off time of the second switching transistor is obtained, and a turn-on moment of the controllable switching transistor is controlled according to the pre-off time.

18. The power supply method according to claim 15, wherein: the second operating mode is a discontinuous-conduction mode, a pre-on time of the first switching transistor is obtained, and a turn-on moment of the controllable switching transistor is controlled according to the pre-on time.

* * * * *